(12) United States Patent
Tsutsumi et al.

(10) Patent No.: US 8,151,440 B2
(45) Date of Patent: Apr. 10, 2012

(54) METHOD FOR MANUFACTURING A HEAD SUSPENSION

(75) Inventors: Kunihiro Tsutsumi, Aikoh-gun (JP); Tsuyoshi Amemiya, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 470 days.

(21) Appl. No.: 12/321,185

(22) Filed: Jan. 16, 2009

(65) Prior Publication Data

US 2009/0183359 A1 Jul. 23, 2009

(30) Foreign Application Priority Data

Jan. 22, 2008 (JP) ................. 2008-011999

(51) Int. Cl.
*G11B 5/127* (2006.01)
*H04R 31/00* (2006.01)

(52) U.S. Cl. ............... 29/603.03; 29/603.04; 29/603.06; 29/603.07; 360/240; 360/244; 360/244.2; 360/244.8

(58) Field of Classification Search ............... 29/603.03, 29/603.04, 603.06, 603.07; 360/240, 244, 360/244.2, 244.8; 451/5, 41

See application file for complete search history.

(56) References Cited

U.S. PATENT DOCUMENTS

| 6,543,711 B2 | 4/2003 | Suzuki et al. |
| 2006/0048367 A1* | 3/2006 | Ishihama et al. ................. 29/432 |
| 2008/0158725 A1* | 7/2008 | Hirano et al. ................... 360/86 |

FOREIGN PATENT DOCUMENTS

| JP | 200-339895 | 12/2000 |
| JP | 2001-028174 | 1/2001 |
| JP | 2001-067635 | 3/2001 |

* cited by examiner

Primary Examiner — Paul D Kim (74) Attorney, Agent, or Firm — Jordan and Hamburg LLP

(57) ABSTRACT

A method for manufacturing a head suspension is capable of suppressing the dispersion in the vibration control effect of a head suspension and improve productivity, the manufacturing method includes a step of punching, by use of a hollow punch having a tooth portion at a distal end thereof, a vibration damper piece out from a base material having a vibration damper provided detachably on a liner through an attaching surface, to hold the vibration damper piece on a hollow internal surface of the punch, a step of positioning the punch holding the vibration damper piece on an objective portion of a semi-finished head suspension, and a step of attaching, by use of an extruding implement, the vibration damper piece on the objective portion with the attaching surface through extruding the vibration damper piece from the punch.

10 Claims, 7 Drawing Sheets

(1) PUNCHING PROCESS (2) POSITIONING PROCESS (3) STICKING PROCESS

METHOD FOR MANUFACTURING A HEAD SUSPENSION

BACKGROUND OF THE INVENTION

1. Field of the Invention

The present invention relates to a method, apparatus and jig for manufacturing a head suspension that supports a magnetic head slider of a magnetic disk device, and relates to a manufactured head suspension. In particular, the invention relates to the method, apparatus and jig for manufacturing the head suspension, capable of automating a process to attach a vibration damper on an objective part of a semi-finished head suspension to suppress dispersion in a vibration control effect of the head suspension and improve productivity, and relates to the manufactured head suspension.

2. Description of the Related Art

A head suspension for supporting a magnetic head slider (hereinafter, abbreviated as a "slider") is provided in a magnetic disk device (HDD). The head suspension has a base plate, a load beam attached to the base plate and a flexure attached to the load beam.

In such head suspension, data errors occur due to off tracks that are generated by turbulence (wind excitation), a natural vibration or the like at rotation of the disc for reading or writing of a signal.

Then, in order to reduce or remove the vibration of the head suspension, there is a vibration control technique which attaches or sticks a vibration damper on the head suspension (for example, refer to Japanese Patent Laid-Open No. 2001-067635, No. 2001-028174 and No. 2000-339895). The vibration damper has a viscoelastic body layer and a restraint body layer laminated on the viscoelastic body layer.

In this vibration control technique, the viscoelastic body layer is disposed between the head suspension and the restraint body layer to deform according to a vibration deformation of the head suspension. At the time of this deformation, the viscoelastic body layer generates an internal resistance (friction of molecules) to transform the vibrational energy into a thermal energy. Therefore, it can largely reduce the vibration of the head suspension.

In sticking such vibration damper on the head suspension, for example, a mold-releasing paper is firmly stuck on the viscoelastic body layer side of the vibration damper in advance. Then, this vibration damper is punched out and processed into a required shape one after another. The punched-out vibration dampers are once aligned on a liner, and an operator sticks them on a required part on the head suspension manually using a pincette etc.

However, according to the investigation by the inventors of the present invention, when a manufacturing process of the head suspension includes a hand working, it results in dispersion of a vibration control effect of the head suspension and deteriorates productivity.

Then, the inventors of the present invention have completed this invention at last, as a result of repeating trial-and-error in order to automate the process for attaching or sticking the vibration damper on the head suspension.

SUMMARY OF THE INVENTION

An object of the present invention is to provide a method, apparatus and jig for manufacturing a head suspension, capable of suppressing dispersion in a vibration control effect of the head suspension and improving productivity of the head suspension, and is to provide a manufactured head suspension.

In order to accomplish the object, an aspect of the present invention includes a step of punching, by use of a hollow punch having a tooth portion at a distal end thereof, a vibration damper piece out from a base material having a vibration damper provided detachably on a liner through an attaching surface, to hold the vibration damper piece on a hollow internal surface of the punch. The aspect also includes a step of positioning the punch holding the vibration damper piece on an objective portion of a semi-finished head suspension. The aspect further includes a step of attaching, by use of an extruding implement, the vibration damper piece to the objective portion with the attaching surface through extruding the vibration damper piece from the punch.

Therefore, it can punch the vibration damper piece out from the base material using the punch and can hold the punched-out vibration damper piece on the hollow internal surface of the punch. Then, it can extrude the vibration damper piece to attach directly on the objective portion using the extruding implement.

Namely, in comparison with a case of a manufacturing process where, for example, the punched-out vibration damper pieces aligned once on the liner are picked up and stuck on the objective portion one by one, it can simplify man-hour and drive control for handling of the vibration damper piece to carry out the positioning for attaching the vibration damper piece with high degree of accuracy. This results in suppressing dispersion in a vibration control effect of the head suspension.

At the same time, it can prevent the vibration damper piece from scattering and being lost before happens, and can improve the productivity.

BRIEF DESCRIPTION OF THE DRAWINGS

FIGS. 3(1) to (3) are views in which FIG. 3(1) shows a punch, FIG. 3(2) shows a extruding pin and FIG. 3(3) shows a state of use of the punch and the extruding pin as a jig for manufacturing the head suspension according to the embodiment of the present invention;

FIGS. 5(1) to (3) are explanatory views showing processes of a method for manufacturing the head suspension in time-series according to the embodiment of the present invention;

DETAILED DESCRIPTION OF THE PREFERRED EMBODIMENTS

A method, apparatus and jig for manufacturing a head suspension, and a manufactured head suspension according to an embodiment of the present invention are described in detail hereafter with reference to drawings.

First, the apparatus and jig used for the method for manufacturing the head suspension according to an embodiment of the present invention is described.

Figure 1:
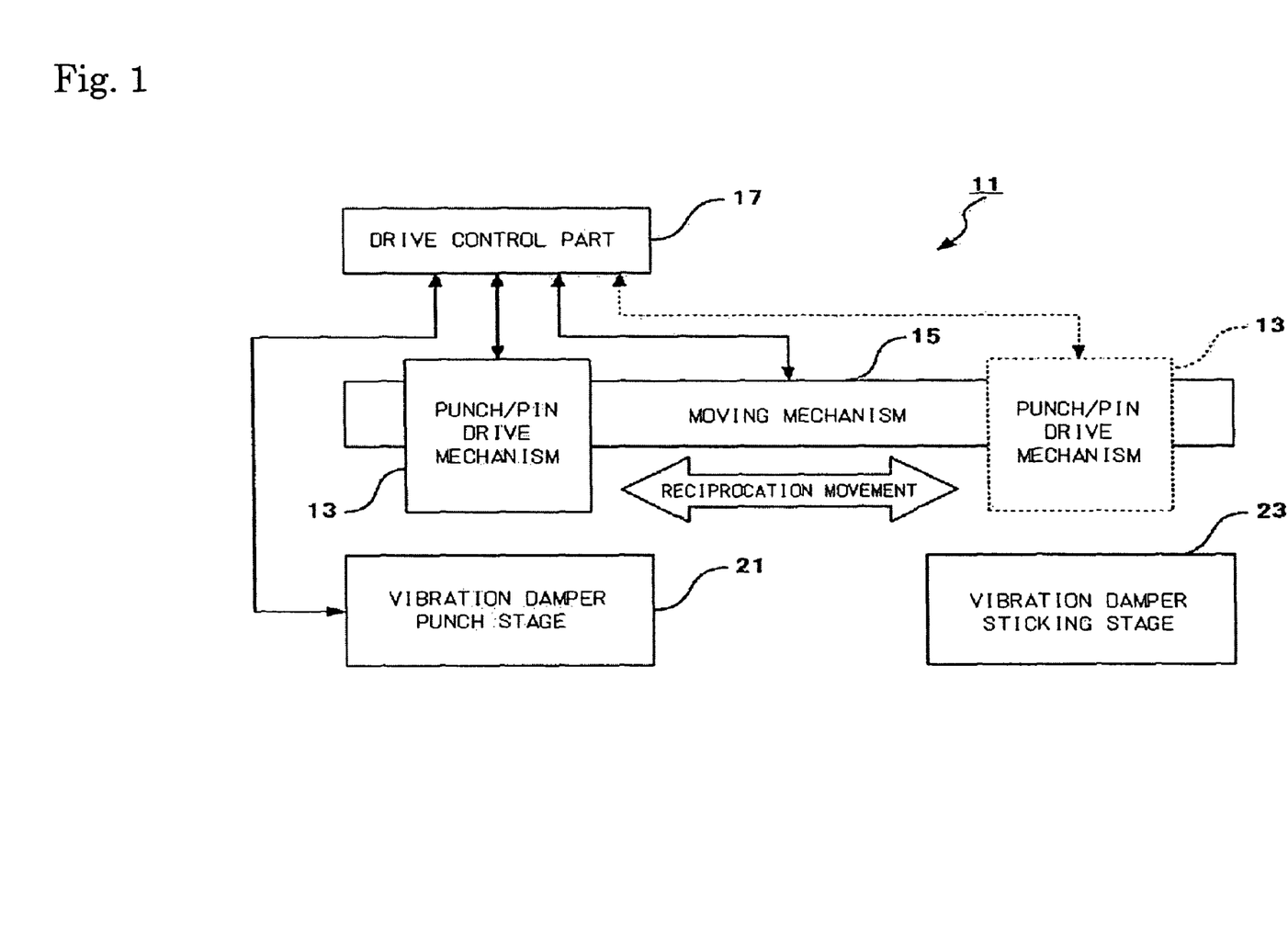
FIG. 1 is a schematic functional block diagram showing an apparatus for manufacturing a head suspension according to an embodiment of the present invention.
Figure 2:
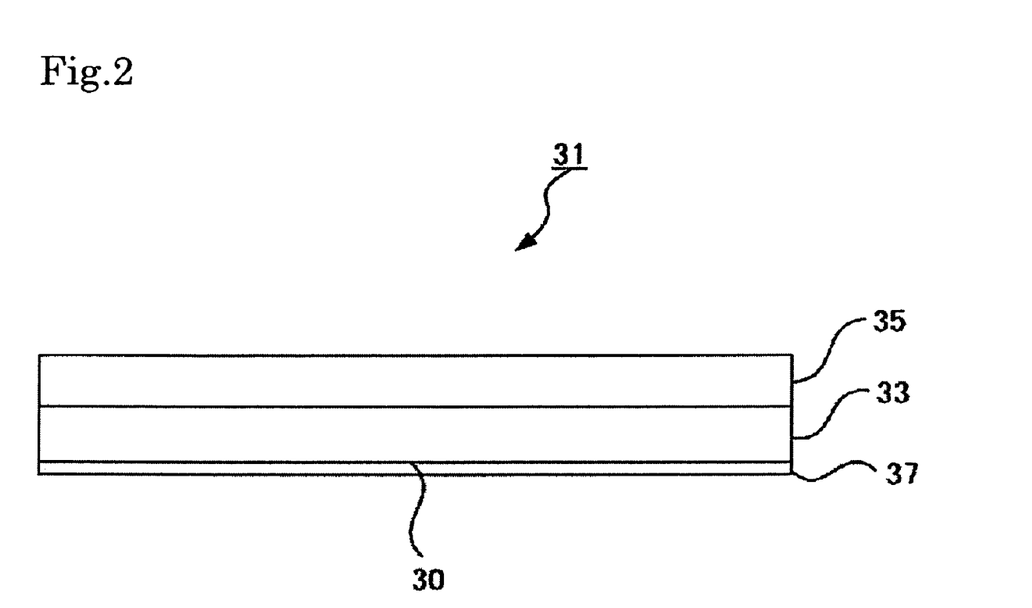
FIG. 2 is a side view of a vibration damper base material to be stuck on a head suspension according to the embodiment of the present invention.
Figure 3:
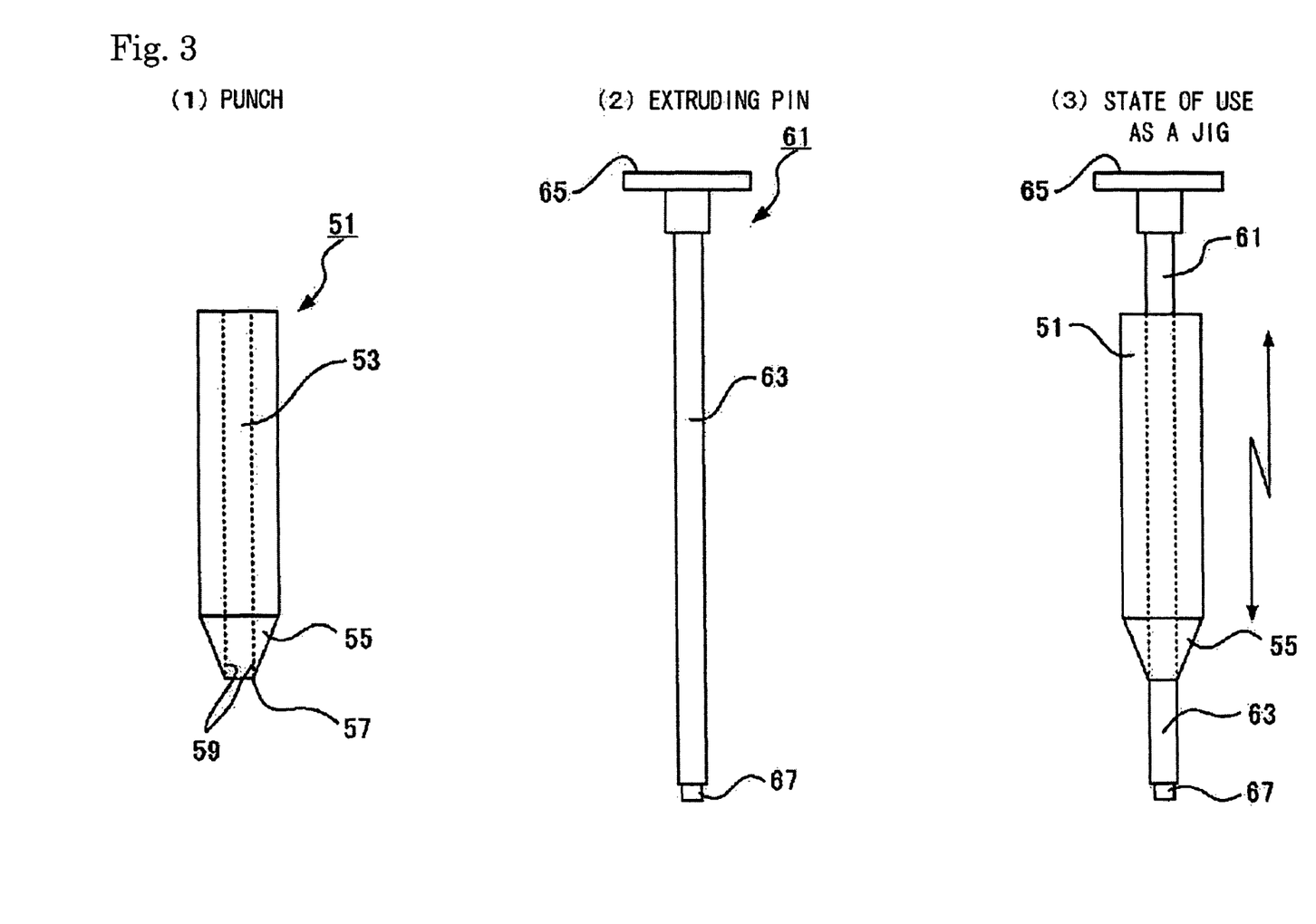
Figure 4:
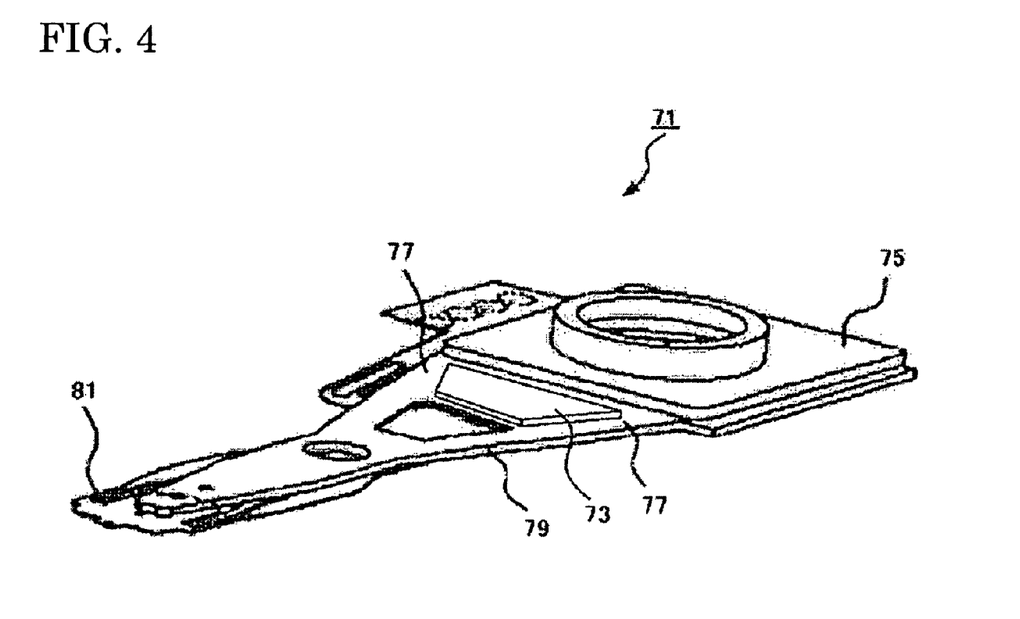
FIG. 4 is a perspective view showing the head suspension to which a vibration damper piece is attached according to the embodiment of the present invention.
Figure 5:
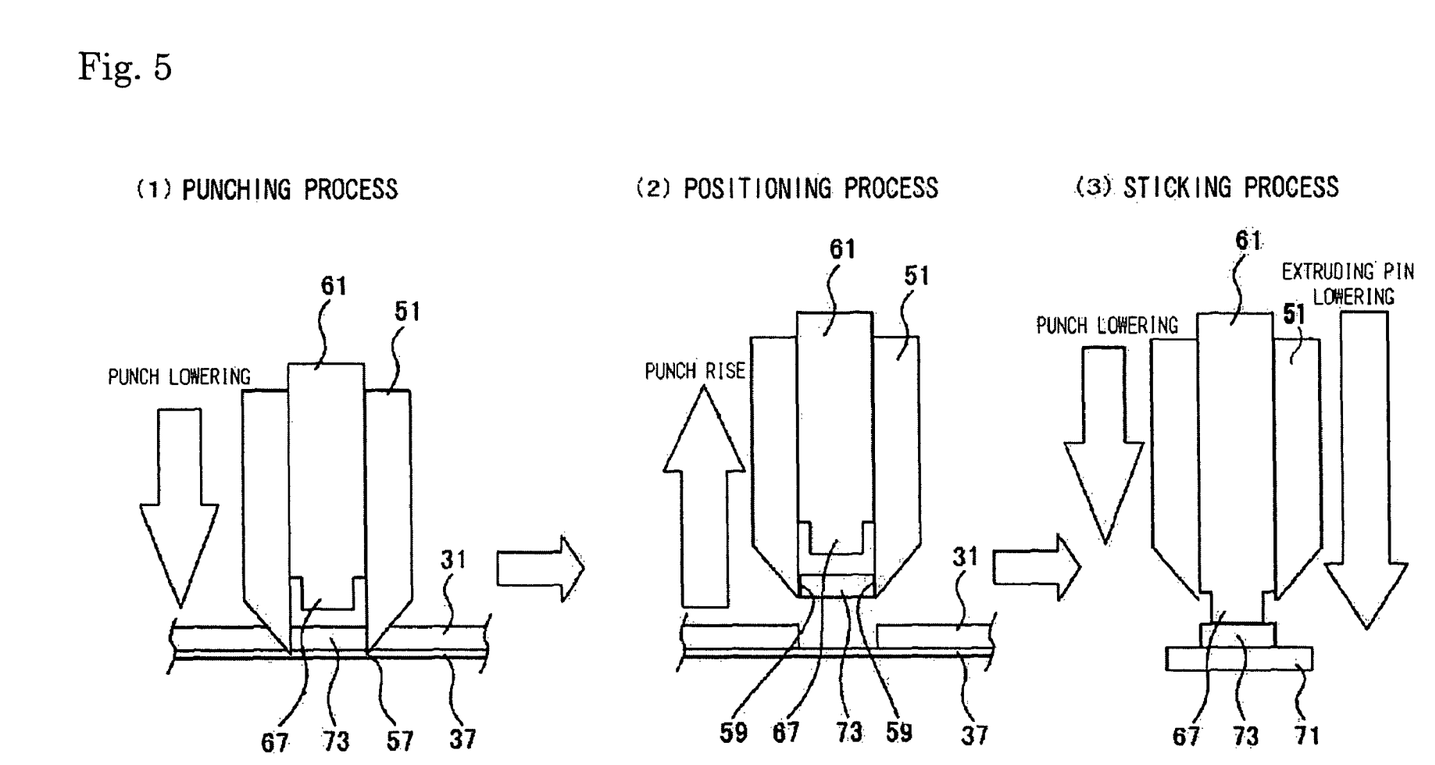

FIG. 1 is a schematic functional block diagram showing the head suspension manufacturing apparatus (apparatus for manufacturing the head suspension), FIG. 2 is a side view of a vibration damper base material to be stuck on a head suspension. FIGS. 3(1) to (3) are views in which FIG. 3(1) shows a punch, FIG. 3(2) shows a extruding pin and FIG. 3(3) shows a state of use of the punch and the extruding pin as the manufacturing jig (jig for manufacturing the head suspension). FIG. 4 is a perspective view showing the head suspension to which a vibration damper piece is attached.

As shown in FIGS. 1 to 4, the head suspension manufacturing apparatus 11 is used for attaching or sticking a vibration damper piece 73 (refer to FIG. 4) on a required objective portion on a semi-finished head suspension to manufacture a head suspension 71 (refer to FIG. 4). The vibration damper piece 73 of the present embodiment is punched out from the base material 31 (refer to FIG. 2). The base material 31 has a vibration damper (33 and 35) provided detachably on a liner 37 through an attaching or sticking surface 30.

As mentioned above, an objective portion on which the vibration damper piece 73 is stuck is expressed as "a required objective portion on a semi-finished head suspension" is as follows. The head suspension 71 as a finished product may be manufactured through the process in which the vibration damper piece 73 is stuck on the load beam 79 which is a component part of the head suspension 71.

Such manufacturing aspect is here also intended to be captured within the range of the technical scope according to the present invention. Naturally, the present invention includes an aspect which sticks the vibration damper piece 73 on a nearly-finished head suspension 71 to manufacture the head suspension as the finished product.

The manufacturing apparatus 11 includes a punch 51 (refer to FIG. 3(1)), a punch/pin drive mechanism 13 (refer to FIG. 1), a moving mechanism 15, an extruding pin 61 (refer to FIG. 3(2)), a drive control part 17, a vibration damper punching stage 21 and a vibration damper sticking stage 23.

The punch 51 is hollow having a tooth portion 57 at a distal end. This punch 51 punches the vibration damper piece 73 (refer to FIG. 4) out from the base material 31 (refer to FIG. 2) and holds it on an internal surface 59. The punch/pin drive mechanism 13 corresponding to a punch drive mechanism drives the punch 51 backward and forward in the punching direction.

The moving mechanism 15 relatively moves the punch 51 holding the punched-out vibration damper piece 73 (refer to FIG. 4) on the internal surface 59 to the objective portion.

The extruding pin 61 corresponds to an extruding implement. The extruding pin 61 is inserted inside the hollow punch 51 so as to be movable backward and forward. The extruding pin 61 extrudes the vibration damper piece 73 from the punch 51 to attach or stick on the objective portion with the sticking surface. The punch/pin drive mechanism 13 corresponding to an extruding implement drive mechanism drives the extruding pin 61 backward and forward in the punching direction.

The drive control part 17 is connected to the punch/pin drive mechanism 13, the moving mechanism 15 and the like to perform drive control of them.

In the vibration damper punching stage 21, the punching process of the base material 31 is performed, and in the vibration damper sticking stage 23, the attaching or sticking process of the vibration damper piece 73 punched out from the base material 31 is performed.

The drive control part 17 carries out a drive control. Namely, the drive control part 17 controls the punch 51 to punch the base material 31 through the punch/pin drive mechanism 13. Then, the drive control part 17 controls the punch/pin drive mechanism 13 to relatively move and be positioned to the objective portion through the moving mechanism 15. In the position, the drive control part 17 controls the extruding pin 61 to extrude the vibration damper piece 73 through the punch/pin drive mechanism 13.

With such drive control, the drive control part 17 conducts to stick the extruded vibration damper piece 73 to the objective portion.

As shown in FIG. 2, the base material 31 includes the vibration damper. The vibration damper has a viscoelastic body layer 33 made of adhesive and a restraint body layer 35 integrally laminated on the viscoelastic body layer 33. The vibration damper has the sticking surface 30 formed on the end surface of the viscoelastic body layer 33. On the sticking surface 30, the liner (separator) 37 is laminated tentatively for maintaining the adherence of the sticking surface 30.

At the time of using the vibration damper, the liner 37 is exfoliated from the sticking surface 30 to be struck on the objective portion.

It is preferred to use acrylic adhesive which is generally excellent in vibration damping properties and heat resistance as a material of the viscoelastic body layer 33, although not particularly limited. The thickness of the viscoelastic body layer 33 made of the adhesive is usually preferred to be set as about 15 to 250 µm, although not limited in particular.

That is, the vibration control effect of a head suspension becomes poor in the case of the thickness being less than 15 µm, and the spring properties of a head suspension are held back in the case of the thickness being more than 250 µm.

As for the material for the restraint body layer 35, a metal plate, plastic film or the like is suitably used for example, although not limited in particular. Particularly, because of the higher the elastic modulus the more excellent vibration damping properties, it is preferred that the material where the elastic modulus according to JISK7127 is more than 2.943 GN/m$^2$ (300 kg/mm$^2$ before conversion) is used.

For example, a stainless plate, an aluminum plate, a copper plate, a phosphor bronze plate, a beryllium copper plate or the like may be applied as the material of the metal plate of the restraint body layer 35. For example, polyimide resin, biaxial-oriented polyethylene terephthalate (PET), biaxial-oriented polypropylene, aramid resin, polyethylenenaphthalate (PEN) or the like may be applied as the material of the plastic film of the restraint body layer 35.

The thickness of the restraint body layer 35 is preferred to be set about 10 to 150 µm in the case of a metal plate, and to about 20 to 200 µm in the case of plastic film, respectively, although not limited in particular.

That is, the effect as a restraint body layer becomes poor in the thickness less than 10 µm with the metal plate and less than 20 µm with plastic film, and the spring properties of the head suspension are held back in the thickness more than 150 µm with the metal plate and more than 200 µm with plastic film.

The liner 37 is laminated tentatively on the sticking surface 30 of the viscoelastic body layer 33, so that it requires the good mold release property with respect to the viscoelastic body layer 33. The liner 37 has a tentatively laminated surface fitting to the sticking surface 30 and the tentatively laminated surface is preferably mold release processed with non-silicone series mold release processing agent, although not limited in particular.

As shown in FIGS. 3(1) to (3), the combination of the punch 51 and the extruding pin 61 as the manufacturing jig for the head suspension according to the embodiment of the present invention are mounted on the punch/pin drive mechanism 13.

The punch 51 is made of a metallic material such as stainless steel. The punch 51 has an approximately trapezoidal sectional shape with chamfered corners. Inside the punch 51, a hollow portion 53 has an approximately trapezoidal sectional shape with chamfered corners. The sectional shape defines an approximately trapezoid shape of the vibration damper piece 73.

On a distal end portion 55 in the punching direction of the punch 51, the tooth portion 57 is formed to punch the base material 31. On the inner periphery of the distal end portion 55, the internal surface 59 is formed and polished through a smoothing process. With the polished internal surface 59, it can smoothly and easily punch the vibration damper piece 73 out and improve in the releasability of extruding of the punched-out and held vibration damper piece 73.

The extruding pin 61 is made of a metallic material such as stainless steel. As shown in FIG. 3(2), the extruding pin 61 has a shaft portion 63, a plate-like circular fitting portion 65 and a small protrusion 67. The shaft portion 63 has an approximately trapezoid sectional shape with chamfered corners like the hollow portion 53 of the punch 51. The plate-like circular fitting portion 65 is fixed to one end of the shaft portion 63, and the small protrusion 67 is formed on the other end (distal end portion) of the same.

The small protrusion 67 expands the gap between the internal surface 59 of the distal end portion 55 of the punch 51 and the outer periphery of the distal end portion of the extruding pin 61 to form the escaping space. Therefore, when extruding the vibration damper piece 73 that is punched out and held on the internal surface 59 of the punch 51, it can prevent the viscoelastic body layer 33 from clinging in the gap and prevent the vibration damper piece 73 from an extruding defects before happens.

The punch 51 is connected with an actuator (not shown) of the punch/pin drive mechanism 13, to drive the punch 51 backward and forward in the punching direction.

The fitting portion 65 of the extruding pin 61 is connected with an actuator (not shown) of the punch/pin drive mechanism 13. Thereby, the extruding pin 61 inserted into the punch 51 is driven backward and forward in the extruding direction by the actuator driving independently with the punch 51, as shown in FIG. 3(3).

Next, the head suspension manufactured by the above-mentioned head suspension manufacturing apparatus is schematically explained.

As shown in FIG. 4, the head suspension 71 includes a base plate 75, a load beam 79 attached to the base plate 75 with a load bending part 77, and a flexure 81 attached to an end of load beam 79 by, for example, spot-welding.

The load bending part 77 is formed so as to bridge a pair of leg portions between the base plate 75 and the load beam 79, for example. The load beam 79 is made of a precision thin plate spring having a function to apply a load onto the slider (not shown).

The load beam 79 is made of a metal plate, for example, austenitic stainless steels such as SUS304 or SUS305 having a thickness set in several tens μm to about 100 μm.

The base plate 75 and load beam 79 may be separated from each other and joined together by, for example, spot-welding in stead of an integral molding. In this case, the load beam 79 and load bending part 77 may be integral with each other, and a part or the whole of the load bending part 77 may be a thin structure in the board thickness by partial etching etc. Alternatively, the load bending part 77 may be separated from and fixed to the load beam 79 as a hinge. In this case, the load bending part 77 may be fixed to base plate 75 by, for example, spot-welding.

The head suspension 71 shown in FIG. 4 according to the embodiment is only an example. Even if the head suspension has a shape and a configuration other than this embodiment, the present invention is applicable.

If the present invention is applied, the vibration damper piece 73 can be appropriately attached to the required objective portion where the vibration can be effectively suppressed.

Figure 6:
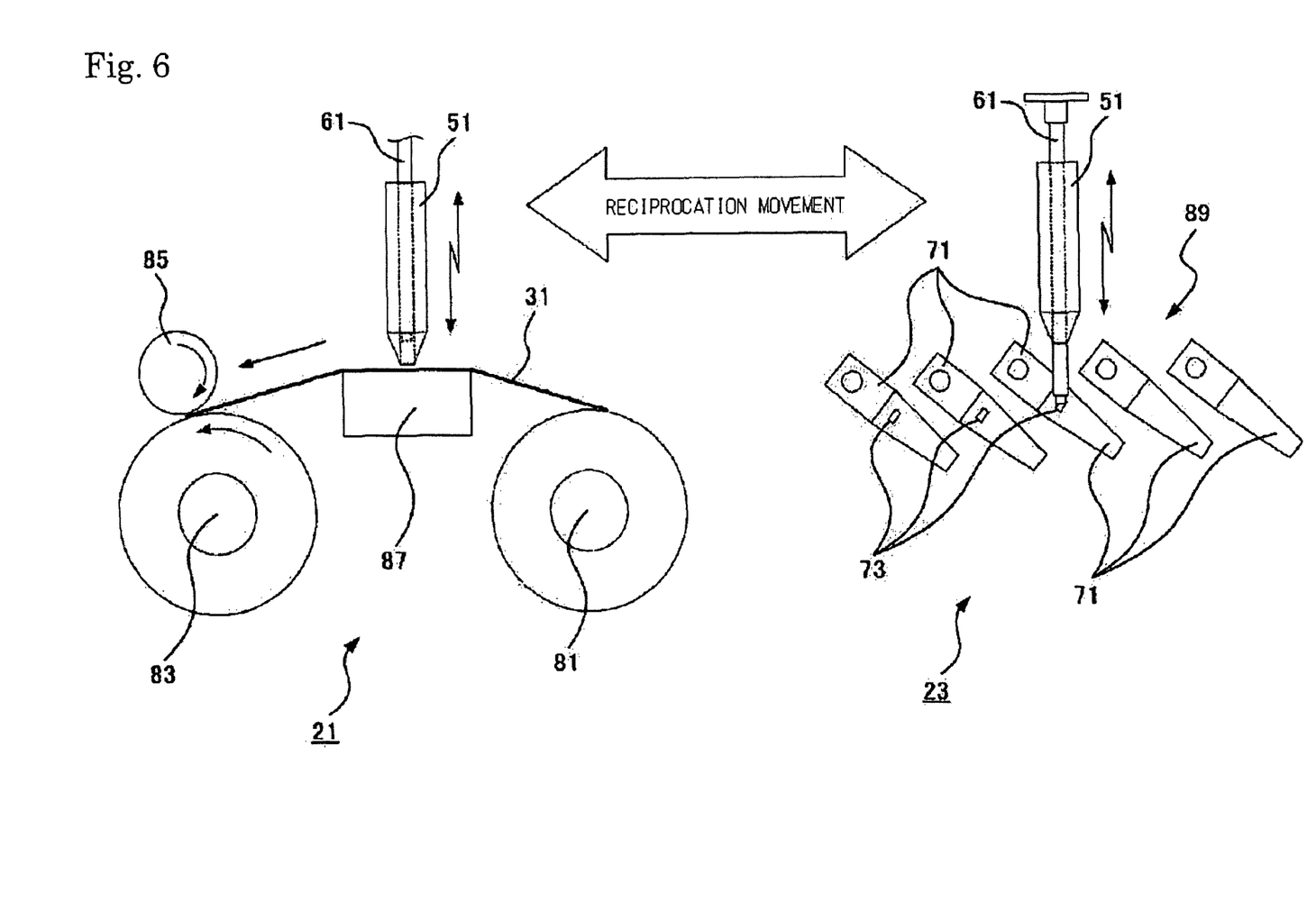
FIG. 6 is an explanatory view schematically showing the method for manufacturing the head suspension according to the embodiment of the present invention.
Figure 7:
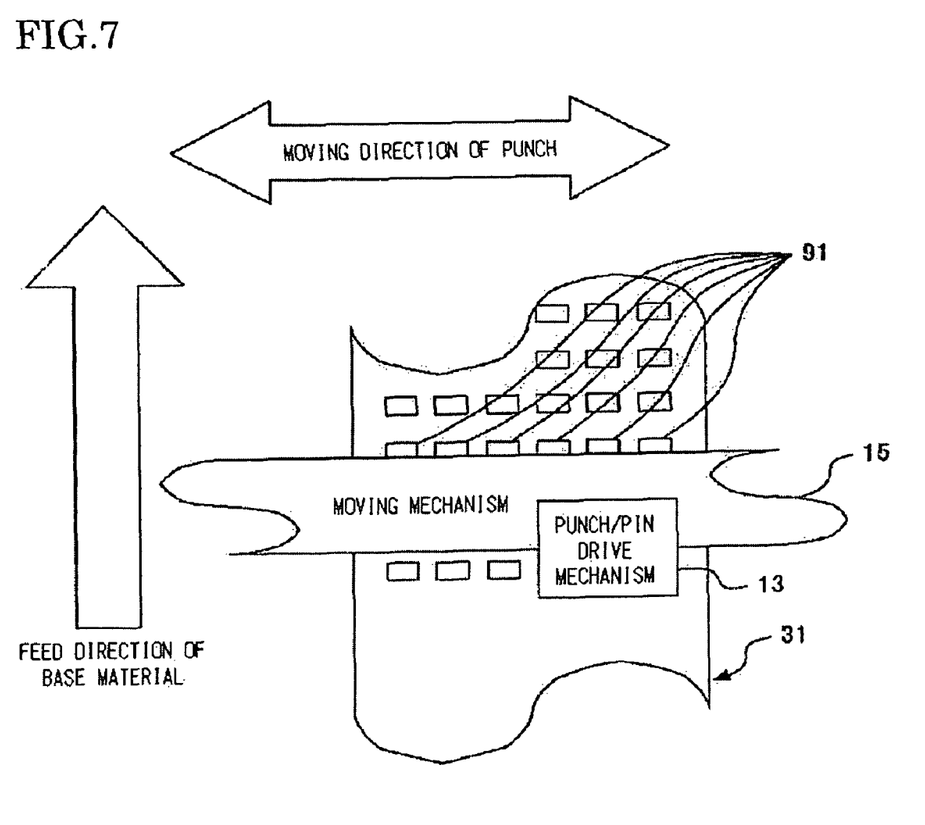
FIG. 7 is an explanatory view schematically showing the method for manufacturing the head suspension according to the embodiment of the present invention.

Next, a method for manufacturing the head suspension (manufacturing method) according to the embodiment of the present invention is described concretely with reference to FIG. 5 to FIG. 7.

FIGS. 5(1) to (3) are explanatory views showing processes of a method for manufacturing the head suspension in time-series, and FIG. 6 and FIG. 7 are explanatory views schematically showing the method for manufacturing the head suspension according to an embodiment of the present invention.

The method for manufacturing the head suspension according to the embodiment of the present invention automates a process to attach or stick the vibration damper piece to the head suspension. For this, it can suppress dispersion in a vibration control effect and improve a productivity of the head suspension.

In particular, the method for manufacturing the head suspension according to the embodiment sticks the vibration damper piece 73 on the required objective portion of the semi-finished head suspension having the base plate 75, load beam 79 and flexure 81 to manufacture the head suspension 71.

In the method for manufacturing the head suspension, a punching process (refer to FIG. 5(1) and the left-hand figure in FIG. 6), a positioning process (refer to FIG. 5(2) and the right-hand figure in FIG. 6), and an attaching or sticking process (refer to FIG. 5(3) and the right-hand figure in FIG. 6) are carried out.

In the punching process, as shown in FIG. 5, the punch 51 is driven downwards so as to insert the tooth portion 57 into the base material 31 from the restraint body layer 35 to the viscoelastic body layer 33. As this result, the vibration damper piece 73 is punched out in a predetermined shape (trapezoidal shape) from the base material 31 and the punched-out vibration damper piece 73 is held on the hollow internal surface 59 of the punch 51.

In the positioning process, the punch 51 holding the punched-out vibration damper piece 73 on internal surface 59 is driven upwards. Then, it aligns the punch 51 with the objective portion to relatively position them.

In the sticking process, after the relative positioning in the positioning process, the extruding pin 61 inserted inside the punch 51 is driven downwards with respect to the punch 51 while driving the punch 51 downwards. Therefore, the vibration damper piece 73 is extruded from the punch 51 and is stuck on the objective portion.

As mentioned above, the internal surface 59 of the distal end portion in the punching direction of the punch 51 is smoothed. In the extruding pin 61, the distal end portion (small protrusion) 67 in the extruding direction is made small.

The base material 31 can be formed in approximately belt-like and be wound around a core material. In this case, the wound base material 31 is applied to a vibration damper punching stage 21 configured as the left-hand figure in FIG. 6.

In the punching stage 21, the base material 31 wound around the core material is set to a driven shaft 81. The one end of the wound base material 31 is engaged with a main driving shaft 83. This base material 31 is fed out by a predetermined distance respectively in proper timing by a feed roller 85. The base material 31 is spanned across over the punching base 87 provided between the shafts 81 and 83. The punching process is carried out by a coordinated operation of the punch 51 and extruding pin 61 to form the vibration damper piece 73.

The vibration damper sticking stage 23 is configured as the right-hand figure in FIG. 6. The sticking stage 23 has a work clamp (not shown) to which a chained article 89 including a plurality of chained head suspensions 71 is set for fixing the chained article 89 with jigs. In the sticking stage 23, the vibration damper piece 73 is stuck on the required objective portion of each head suspension 71 of the chained article 89.

In the configuration of the punching stage 21 and sticking stage 23 mentioned above, the relative positioning between the punch 51 and the objective portion is carried out as shown in FIG. 7, for example.

The positioning is carried out by moving the punch 51 linearly to the objective portion with the moving mechanism 15. The moving direction of the punch/pin drive mechanism 13 with the punch 51 mounted thereon is set to intersect at an approximately right angle with respect to the feed direction of the base material 31.

With this configuration, it can punch two or more vibration damper pieces 73 out along the across-the-width direction of the belt-like base material 31. This results in a smooth work while improving the material yield. A numeral "91" in FIG. 7 shows punched marks of the vibration damper piece 73 in the base material 31.

In this way, the method for manufacturing the head suspension according to the embodiment of the present invention can punch the vibration damper piece 73 out from the base material 31 using the punch 51, and at the same time, it can hold the punched-out vibration damper piece 73 on the internal surface 59 of the punch 51. This vibration damper piece 73 can be extruded by the extruding pin 61 inserted inside the punch 51 to be directly stuck on the objective portion.

Therefore, in comparison with the case where the punched-out vibration damper pieces aligned once on the liner by off-line are picked up and stuck on the objective portion one by one, the embodiment can simplify the man-hour and drive control for handling the vibration damper piece 73 to carry out the positioning for sticking the vibration damper piece 73 with high degree of accuracy. This results in suppressing dispersion in a vibration control effect of the head suspension 71. At the same time, it can prevent the vibration damper piece 73 from scattering and being lost before happens, and can improve the productivity.

The distal end portion 55 in the punching direction of the punch 51 is provided with the internal surface 59 that is smoothly processed by polishing. The distal end portion 55 can realize the facilitation of punching the vibration damper piece 73 out and the enhancement in the releasability of extruding the vibration damper piece 73 that is punched out and held on the internal surface 59.

The distal end portion in the extruding direction of the extruding pin 61 is provided with the small protrusion 67, so that the distal end portion of the extruding pin 61 can expand the gap with respect to the internal surface 59 of the punch 51 to form the escaping space. As a result, when extruding the vibration damper piece 73 that is punched out and held on the internal surface 59 of the punch 51, it can prevent the viscoelastic body layer 33 from clinging in the gap and prevent the vibration damper piece 73 from an extruding defects before happens.

Relative positioning between the punch 51 and the objective portion is carried out by moving the punch 51 linearly to the objective portion with the moving mechanism 15. The linearly-moving direction of the punch/pin drive mechanism 13 with the punch 51 mounted thereon intersects at an approximately right angles across the feed direction of the base material 31. Therefore, it can punch two or more vibration damper pieces 73 out along the across-the-width direction of the belt-like base material 31. This results in the smoothly-punching work while improving the material yield.

With the manufacturing jig (51 and 61) for the head suspension according to the embodiment of the invention, the punch 51 can punch the vibration damper piece 73 out from the base material 31 to hold the punched-out vibration damper piece 73 on the hollow internal surface 59. The extruding pin 61 inserted inside the punch 51 can extrude this vibration damper piece 73 to stick it directly on the objective portion.

Therefore, the optimal manufacturing jig (51 and 61) can be provided when automating the process for sticking the vibration damper piece 73 on the head suspension 71.

The head suspension manufactured by the manufacturing method according to the embodiment of the present invention is uniform and excellent with the vibration suppression property. Therefore, it can read or write of a signal with high degree of accuracy.

With the manufacturing apparatus 11 for the head suspension according to the embodiment of the present invention, the vibration damper piece 73 can be punched out from the base material 31 using the punch 51, and at the same time, can be held on the hollow internal surface 59 of the punch 51. This vibration damper piece 73 can be extruded from the punch 51 by the extruding pin 61 inserted inside the punch 51 to be stuck directly on the objective portion.

Therefore, in comparison with a manufacturing process where the punched-out vibration damper pieces aligned once on the liner by off-line are picked up and stuck on the objective portion one by one, the embodiment of the present invention can simplify the man-hour and drive control for handling the vibration damper piece 73 to carry out the positioning for sticking the vibration damper piece 73 with high degree of accuracy. This results in suppressing dispersion in a vibration control effect of the head suspension 71. At the same time, it can prevent the vibration damper piece 73 from scattering and being lost before happens, and can improve the productivity.

The present invention should not be limited to embodiments mentioned above and any modifications can be made without departing from the scope or technical spirit of the invention read from the claims and the whole range of the description. Therefore, as the matter of course, the manufacturing method, the manufacturing apparatus, the jigs for manufacturing of the head suspension, and the head suspension accompanied by such changes and modifications are also deemed to be encompassed by the technical scope of the present invention.

For example, in the embodiments of the present invention, an appearance configuration of an approximately trapezoid shape chamfered corners of the vibration damper piece is illustrated and described, the present invention is not limited to the embodiments. It is not necessary to say that a vibration damper piece of any shape is employed if the vibration control effect of the head suspension can be acquired.

What is claimed is:

1. A method for manufacturing a head suspension, comprising the steps of:
 punching, by use of a hollow punch having a tooth portion at a distal end thereof, a vibration damper piece out from a base material having a vibration damper provided detachably on a liner through an attaching surface without punching out the liner, to hold the vibration damper piece on a hollow internal surface of the punch that has a holding force larger than an attaching force of the vibration damper to the liner;
 moving the punch holding the vibration damper piece away from the liner to detach the vibration damper piece from the liner;
 positioning the punch holding the vibration damper piece on an objective portion of a semi-finished head suspension; and
 attaching, by pushing on the vibration damper piece with a solid extruding implement, the vibration damper piece on the objective portion with the attaching surface through extruding the vibration damper piece from the punch.

2. The method for manufacturing the head suspension according to claim 1, wherein
 an internal surface of a distal end portion of the punch in a punching direction is made to be smoothed.

3. The method for manufacturing the head suspension according to claim 1, wherein
 a distal end portion of the extruding implement in an extruding direction is smaller than the hollow internal surface of the punch holding the vibration damper piece.

4. The method for manufacturing the head suspension according to claim 1, wherein
 the base material for the vibration damper piece is formed in an approximately band-like shape, and
 the punch moves in a right angle direction approximately with respect to a feed direction of the base material.

5. The method for manufacturing the head suspension according to claim 1, wherein
 the vibration damper includes a viscoelastic body layer, a restraint body layer laminated on the viscoelastic body layer, and
 the attaching surface is formed by a surface of the viscoelastic body layer.

6. A method for manufacturing a head suspension, comprising the steps of:
 punching a vibration damper piece out from a base material with a hollow punch having a toothed portion at a distal end thereof, the base material having a vibration damper layer provided detachably on a liner;
 wherein said punching comprises pressing the hollow punch into the base material to cut said vibration damper piece from said base material without cutting said liner from said base material, said cut vibration damper piece becoming situated internally within a hollow portion at the distal end of the hollow punch during said pressing, lifting the hollow punch out of the base material while the cut vibration damper piece remains situated within said hollow portion, wherein a holding force for keeping the cut vibration damper piece situated within said hollow portion exceeds an attaching force between the cut vibration damper piece and the liner of the base material, so that said vibration damper piece becomes separated from the liner during said lifting;
 positioning the punch, while the punch continues holding the vibration damper piece, over an objective portion of a semi-finished head suspension; and
 moving an extruding pin within said hollow punch to push said vibration damper piece with a distal end of said extruding pin out said distal end of the hollow punch onto said objective portion of the semi-finished head suspension.

7. The method for manufacturing the head suspension according to claim 6, wherein an internal surface of the hollow portion at the distal end of the hollow punch in a punching direction is smooth.

8. The method for manufacturing the head suspension according to claim 6, wherein a cross-sectional area of the distal end of said extruding pin is less than a cross-sectional area through which the extruding pin moves within the hollow portion at the distal end of the hollow punch.

9. The method for manufacturing the head suspension according to claim 6, wherein
 the base material for the vibration damper piece is formed in an approximately band-like shape, and
 the punch moves in a right angle direction approximately with respect to a feed direction of the base material.

10. The method for manufacturing the head suspension according to claim 6,
 wherein the vibration damper layer is formed by a viscoelastic body layer and a restraint body layer laminated onto the viscoelastic body layer,
 wherein said pressing comprises pressing the hollow punch through the restraint body layer and viscoelastic body layer to cut said vibration damper piece from said base material, and
 wherein said moving comprises pushing said vibration damper piece onto said objective portion of the semi-finished head suspension to bring an adhesive surface of the viscoelastic body layer of the vibration damper piece into adhesive contact with said objective portion of the semi-finished head suspension.

* * * * *